US012568421B2

(12) United States Patent
Tsushima

(10) Patent No.: US 12,568,421 B2
(45) Date of Patent: Mar. 3, 2026

(54) COMMUNICATION CONTROLLER FOR ELECTRONIC DEVICES INSIDE AND OUTSIDE A MOBILE OBJECT AND ASSOCIATED COMMUNICATION CONTROL METHOD

(71) Applicant: HONDA MOTOR CO., LTD., Tokyo (JP)

(72) Inventor: Kosei Tsushima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 432 days.

(21) Appl. No.: 18/082,936

(22) Filed: Dec. 16, 2022

(65) Prior Publication Data

US 2023/0300709 A1    Sep. 21, 2023

(30) Foreign Application Priority Data

Feb. 15, 2022    (JP) ................................. 2022-021279

(51) Int. Cl.
*H04L 67/12* (2022.01)
*H04W 4/24* (2024.01)
(Continued)

(52) U.S. Cl.
CPC ........... *H04W 40/02* (2013.01); *H04W 40/26* (2013.01)

(58) Field of Classification Search
CPC ....... H04W 40/02; H04W 40/26; H04W 4/40; H04W 4/24; H04W 4/44; H04W 4/48;
(Continued)

(56) References Cited

U.S. PATENT DOCUMENTS 7,574,217 B1 * 8/2009 Leung ................... H04W 24/02
455/560
2011/0182275 A1 7/2011 Mizusawa et al.
(Continued)

FOREIGN PATENT DOCUMENTS

CN      102149159 A    8/2011
CN      103973569 A    8/2014
(Continued)

OTHER PUBLICATIONS

Chinese Office Action dated Jun. 18, 2025 issued in corresponding Chinese application No. 202310090052.1; English machine translation included (19 pages).
(Continued)

*Primary Examiner* — Ayman A Abaza
*Assistant Examiner* — Tracy L Williams
(74) *Attorney, Agent, or Firm* — Rankin, Hill & Clark LLP

(57) ABSTRACT

A communication controller is a device which controls communication between an electronic device of a mobile object and an external device, and includes: a wireless communication device configured to communicate with the external device respectively via an external communication network; a reception unit configured to receive communication data including a transmission source local IP address from the electronic device; and a route control unit configured to input the received communication data to the wireless communication device based on the transmission source local IP address. The route control unit makes each address group including one or more transmission source local IP addresses correspond to one access point name and inputs the communication data to the wireless communication device.

6 Claims, 3 Drawing Sheets

(51) Int. Cl.

| | | |
|---|---|---|
| *H04W 4/44* | (2018.01) | |
| *H04W 4/48* | (2018.01) | |
| *H04W 40/02* | (2009.01) | |
| *H04W 40/26* | (2009.01) | |
| *H04W 48/16* | (2009.01) | |
| *H04W 76/11* | (2018.01) | |
| *H04W 76/15* | (2018.01) | |

(58) Field of Classification Search
CPC ..... H04W 48/16; H04W 76/11; H04W 76/15;
H04L 67/12
USPC .......................................................... 370/329
See application file for complete search history.

(56) References Cited

U.S. PATENT DOCUMENTS

| | | | | |
|---|---|---|---|---|
| 2013/0034108 A1* | 2/2013 | Kaippallimalil | ...... | H04W 48/17 370/401 |
| 2016/0044593 A1* | 2/2016 | Anpat | ................... | H04W 36/22 370/329 |
| 2016/0197776 A1* | 7/2016 | Das | ....................... | H04W 8/265 455/419 |
| 2017/0111315 A1 | 4/2017 | Long | | |
| 2019/0020985 A1* | 1/2019 | Dai | ......................... | H04W 8/26 |
| 2019/0268828 A1 | 8/2019 | Yin et al. | | |
| 2020/0162994 A1* | 5/2020 | Jayawardena | ........ | H04W 40/02 |
| 2020/0221544 A1* | 7/2020 | Nishizaki | ................ | H04W 4/80 |
| 2020/0228355 A1* | 7/2020 | Huang | .................... | H04L 12/14 |
| 2020/0314608 A1* | 10/2020 | Harada | ................. | H04W 40/22 |
| 2021/0258770 A1 | 8/2021 | Lonkar | | |
| 2021/0289338 A1* | 9/2021 | Hu | ......................... | H04W 76/10 |
| 2023/0188980 A1* | 6/2023 | Lee | ....................... | H04W 12/03 726/2 |
| 2023/0209588 A1* | 6/2023 | Hoshino | .......... | G08G 1/096775 370/329 |

FOREIGN PATENT DOCUMENTS

| | | |
|---|---|---|
| CN | 105263171 A | 1/2016 |
| CN | 105393598 A | 3/2016 |
| CN | 108377532 A | 8/2018 |
| CN | 109495461 A | 3/2019 |
| CN | 109845233 A | 6/2019 |
| JP | 2004-172992 A | 6/2004 |
| JP | 2008-271203 A | 11/2008 |
| JP | 2020-532161 A | 11/2020 |

OTHER PUBLICATIONS

Chinese Office Action Corresponding to Chinese Application No. 202310090052.1, dated Oct. 29, 2025, 19 pages.

* cited by examiner

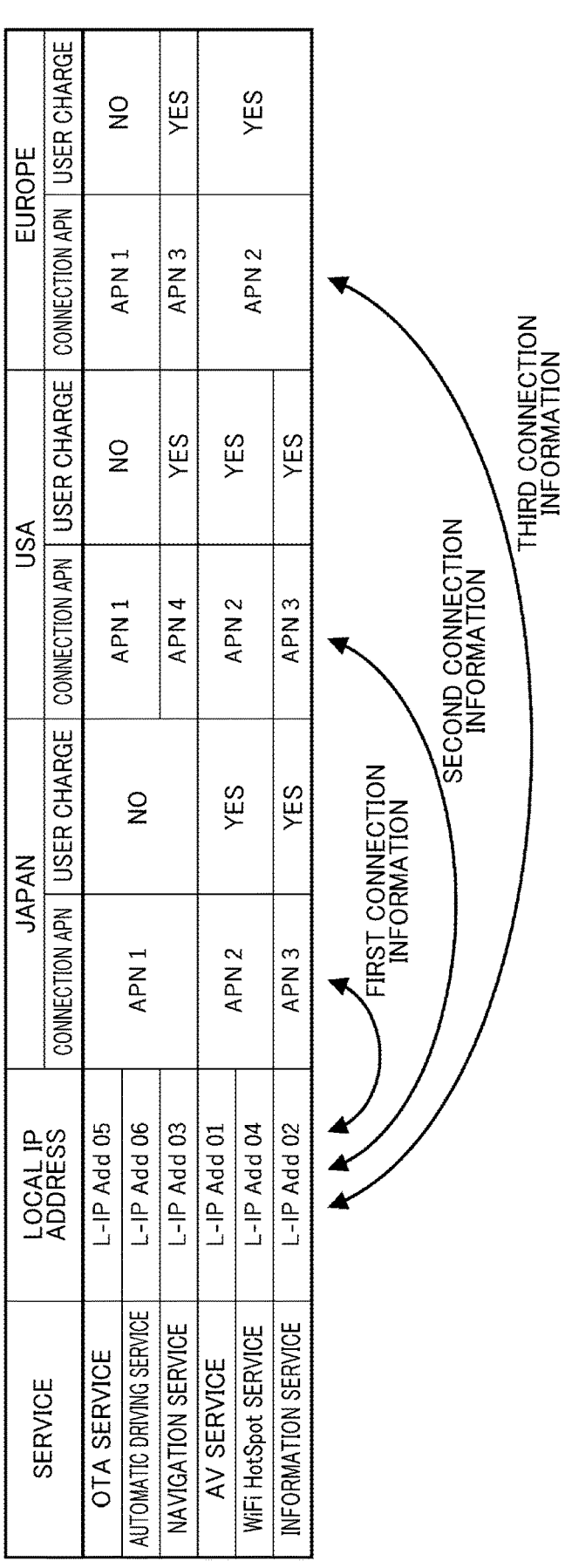

| SERVICE | LOCAL IP ADDRESS | JAPAN | | USA | | EUROPE | |
|---|---|---|---|---|---|---|---|
| | | CONNECTION APN | USER CHARGE | CONNECTION APN | USER CHARGE | CONNECTION APN | USER CHARGE |
| OTA SERVICE | L-IP Add 05 | APN 1 | NO | APN 1 | NO | APN 1 | NO |
| AUTOMATIC DRIVING SERVICE | L-IP Add 06 | APN 1 | NO | APN 1 | NO | APN 1 | NO |
| NAVIGATION SERVICE | L-IP Add 03 | APN 2 | YES | APN 4 | YES | APN 3 | YES |
| AV SERVICE | L-IP Add 01 | APN 2 | YES | APN 2 | YES | APN 2 | YES |
| WiFi HotSpot SERVICE | L-IP Add 04 | APN 2 | YES | APN 2 | YES | APN 2 | YES |
| INFORMATION SERVICE | L-IP Add 02 | APN 3 | YES | APN 3 | YES | APN 2 | YES |

FIRST CONNECTION INFORMATION

SECOND CONNECTION INFORMATION

THIRD CONNECTION INFORMATION

COMMUNICATION CONTROLLER FOR ELECTRONIC DEVICES INSIDE AND OUTSIDE A MOBILE OBJECT AND ASSOCIATED COMMUNICATION CONTROL METHOD

INCORPORATION BY REFERENCE

The present application claims priority under 35 U.S.C. § 119 to Japanese Patent Application No. 2022-021279 filed on Feb. 15, 2022. The content of the application is incorporated herein by reference in its entirety.

BACKGROUND OF THE INVENTION

Field of the Invention

The present invention relates to a communication controller and a communication control method that control communication in a mobile object.

Description of the Related Art

Japanese Translation of PCT International Application Publication No. 2020-532161 discloses a traffic statistic collecting method applied to an in-vehicle service interaction system. In the traffic statistic collecting method, when an in-vehicle IVI (infotainment system) executes a first service, a T-box (telematics box) communicates with the IVI using a first private IP address and communicates with a TSP (content provider) using a first APN (first access point name) corresponding to the first private IP address and a first external IP address. Then, when the IVI executes a second service, the T-box communicates with the IVI using a second private IP address and communicates with the TSP using a second APN corresponding to the second private IP address and a second external IP address.

However, in a prior art, when the number of services to be provided increases, the number of APNs increases accompanying that and the number of line contracts may increase.

From the background described above, an object of the present invention is to reduce the number of APNs to be required and to reduce the number of line contracts in communication between an electronic device in a mobile object and an external device.

SUMMARY OF THE INVENTION

One mode of the present invention aspect is a communication controller which controls communication between a plurality of electronic devices present inside a mobile object and a plurality of external devices present outside the mobile object and is provided in the mobile object, the communication controller includes: a wireless communication device configured to communicate with one or more external devices via an external communication network present outside the mobile object; a reception unit configured to receive communication data including a transmission source local IP address indicating a transmission source from the electronic devices; and a route control unit configured to input the received communication data to the wireless communication device based on the transmission source local IP address, a plurality of access point names are allocated to the wireless communication device, and the route control unit makes each address group including one or more transmission source local IP addresses correspond to one of the access point names and inputs the communication data to the wireless communication device.

According to another mode of the present invention aspect, the plurality of access point names include an access point name used for user charged communication which is communication generating a charge to a user of the mobile object, and an access point name used for user free-of-charge communication which is communication not generating a charge to the user.

According to a further mode of the present invention aspect, a state acquisition unit configured to acquire communication state information about whether or not the communication between the electronic devices and the external device is being normally performed and transmit the acquired communication state information to the electronic devices is provided.

According to a still further mode of the preset invention aspect, the communication state information includes information about whether or not each of the communication between the electronic devices and the route control unit, the communication between the route control unit and the wireless communication device for each access point name and the communication between the wireless communication device and the external device is normal.

According to a yet further mode of the present invention aspect, connection information indicating a correspondence relation between each address group and the access point name is stored, and the route control unit inputs the communication data to the wireless communication device corresponding to the access point name which is made to correspond to the transmission source local IP address included in the communication data, based on the connection information.

According to a yet still further mode of the present invention aspect, a plurality of pieces of the connection information for each country or region are stored, and the route control unit uses the connection information corresponding to the country or the region where the mobile object is present to input the communication data to the wireless communication device corresponding to the access point name which is made to correspond to the transmission source IP address included in the communication data.

According to a yet still further mode of the present invention aspect, the plurality of pieces of the connection information for each country or region include at least one transmission source local IP address which is made to correspond to the access point name used for the communication generating a charge to a user of the mobile object.

A yet still further mode of the present invention aspect is a communication control method performed by a computer of a communication controller which controls communication between a plurality of electronic devices present inside a mobile object and a plurality of external devices present outside the mobile object and is provided in the mobile object, the communication control method includes: a step of receiving communication data including a transmission source local IP address indicating a transmission source from the electronic devices; and a step of inputting the received communication data to the wireless communication device based on the transmission source local IP address, a plurality of access point names are allocated to the wireless communication device, and each address group including one or more transmission source local IP addresses is made to correspond to one of the access point names and the communication data is inputted to the wireless communication device, in the step of inputting.

According to the present invention aspect, in communication between an electronic device in a mobile object and an external device, the number of APNs to be required for the number of services performed by the electronic device can be reduced and the number of line contracts can be reduced.

BRIEF DESCRIPTION OF THE DRAWINGS

FIG. 1 is a diagram illustrating a configuration of a communication controller according to one embodiment of the present invention;

FIG. 2 is a diagram illustrating an example of a connection table; and

DETAILED DESCRIPTION OF THE PREFERRED EMBODIMENTS

Figure 3:
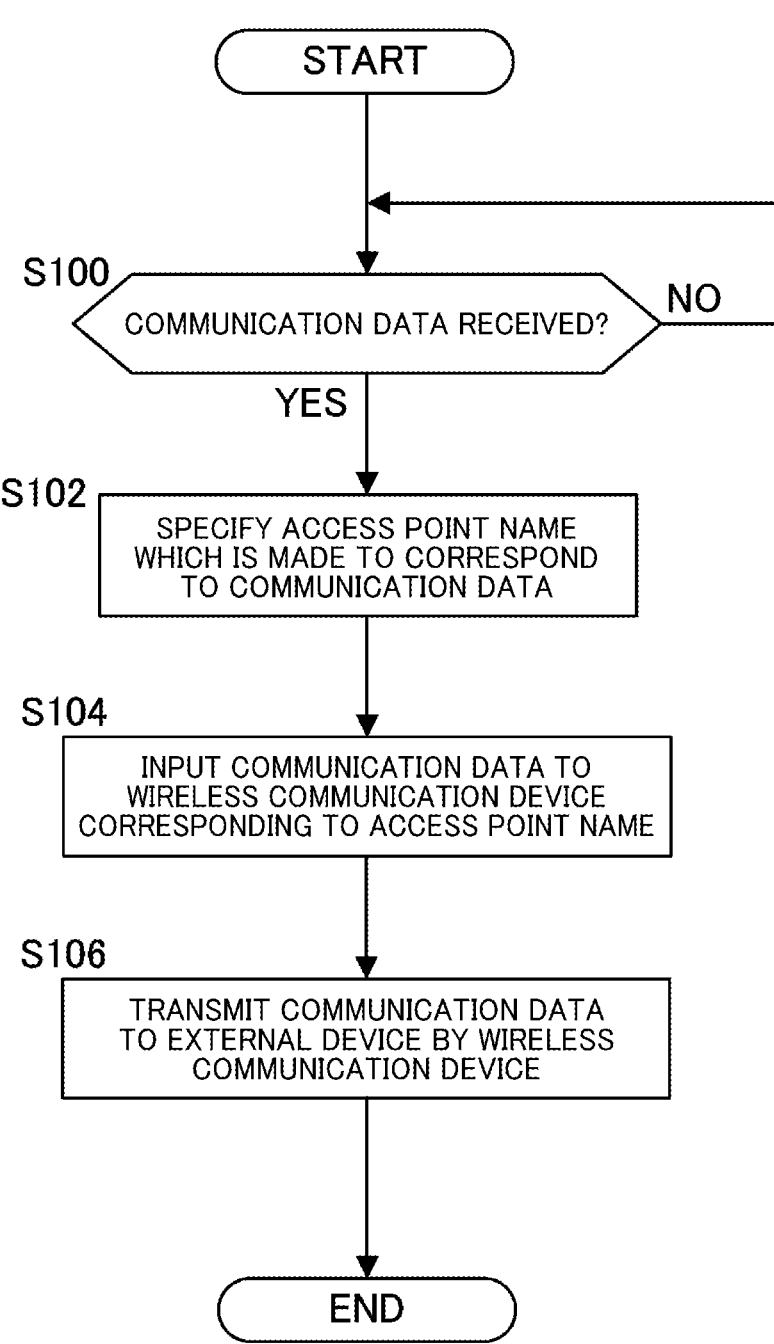
FIG. 3 is a flowchart illustrating a procedure of communication control in the communication controller.

Hereinafter, the embodiment of the present invention will be explained with reference to the drawings.

Figure 1:
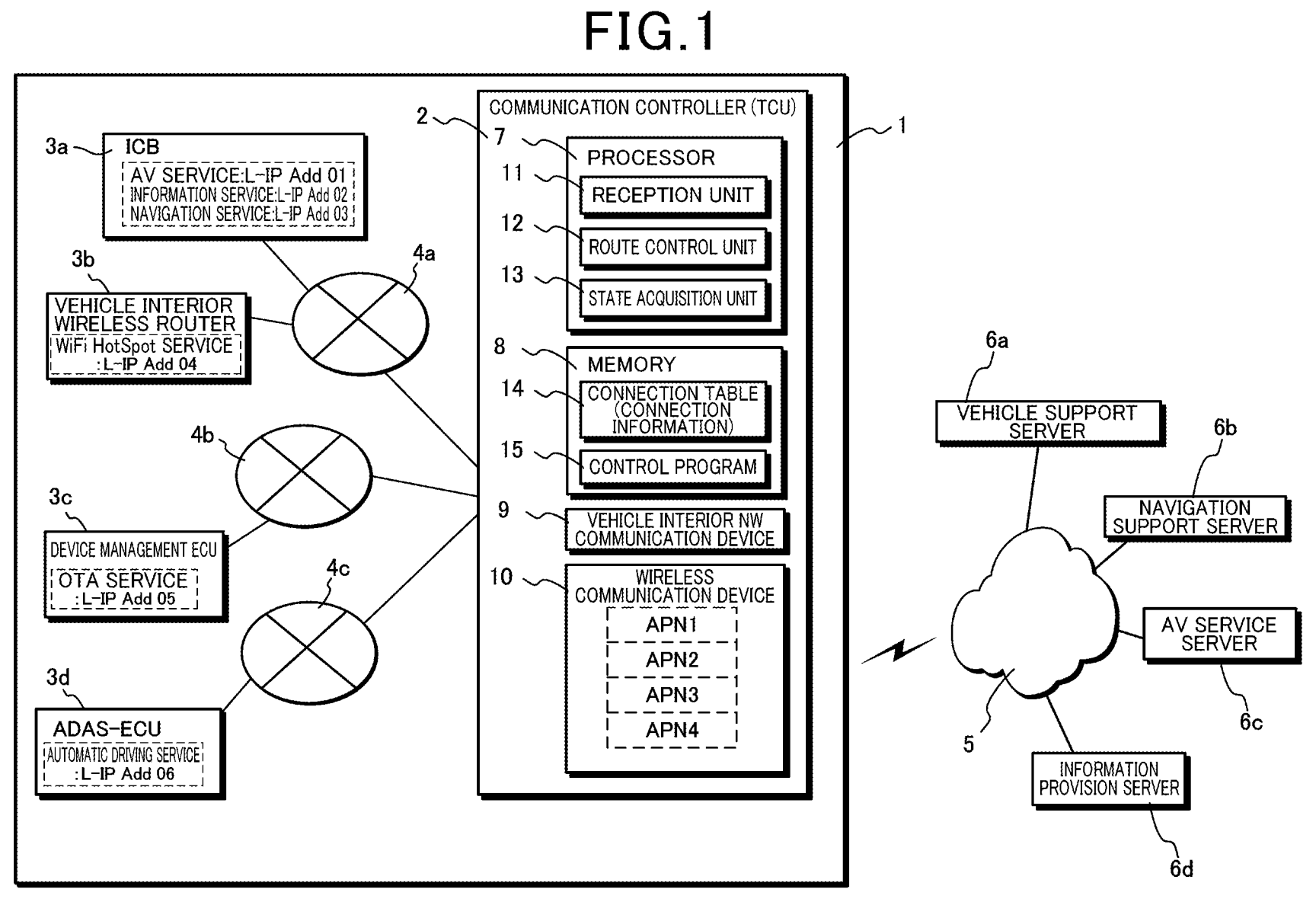

FIG. 1 is a diagram illustrating a configuration of a communication controller 2 according to one embodiment of the present invention. In the present embodiment, the communication controller 2 is, for example, a TCU (telematics control unit) loaded on a vehicle 1 which is a mobile object. The vehicle 1 is loaded with, in addition to the communication controller 2, an ICB (Infotainment Control Box) 3a, a vehicle interior wireless router 3b, a device management ECU (Electronic Control Unit) 3c, and an ADAS (Advanced Driver-Assistance System)-ECU 3d.

The ICB 3a performs a service of providing various kinds of information and entertainments to a passenger of the vehicle 1 by using a speaker, a microphone and a touch panel or the like (all not illustrated) loaded on the vehicle. In the present embodiment, the ICB 3a performs, for example, an AV service of providing music and video images, an information service of providing news and local information, and a navigation service of guiding a route.

The vehicle interior wireless router 3b provides a WiFi® HotSpot service which provides a WiFi environment of a portable terminal such as a smartphone present inside the vehicle 1. The device management ECU 3c provides an OTA (Over The Air) service including control relating to processing of downloading an update program of an electronic device provided in the vehicle from a server outside the vehicle and processing of applying the downloaded update program to an in-vehicle device. The ADAS-ECU 3d provides an automatic driving service by recognizing traffic participants and a structure of roads present in an ambient environment of the vehicle based on information obtained from a camera and an object sensor (both not illustrated) loaded on the vehicle. The device management ECU 3c and the ADAS-ECU 3d are configured with computers. Here, the ICB 3a, the vehicle interior wireless router 3b, the device management ECU 3c and the ADAS-ECU 3d correspond to a plurality of electronic devices present inside a mobile object in the present disclosure. Hereinafter, the ICB 3a, the vehicle interior wireless router 3b, the device management ECU 3c and the ADAS-ECU 3d are collectively referred to as electronic devices 3.

In the vehicle 1, the ICB 3a and the vehicle interior wireless router 3b are connected with the communication controller 2 via a first vehicle interior communication network 4a. In addition, the device management ECU 3c and the ADAS-ECU 3d are connected with the communication controller 2 via a second vehicle interior communication network 4b and a third vehicle interior communication network 4c, respectively. The first vehicle interior communication network 4a, the second vehicle interior communication network 4b and the third vehicle interior communication network 4c are virtual LANs (Local Area Networks) configured by the communication controller 2, for example. Hereinafter, the first vehicle interior communication network 4a, the second vehicle interior communication network 4b and the third vehicle interior communication network 4c are collectively referred to as vehicle interior communication networks 4.

For each of the ICB 3a, the vehicle interior wireless router 3b, the device management ECU 3c and the ADAS-ECU 3d which perform communication via the vehicle interior communication networks 4, to each of the services provided by them, a local IP address to be used for the communication when executing the services is allocated. For example, in the ICB 3a, to the AV service, the information service and the navigation service, L-IP Add01, L-IP Add02 and L-IP Add03 are allocated respectively as the local IP addresses to be used for the communication of the respective services.

Further, to the WiFi HotSpot service of the vehicle interior wireless router 3b, the OTA service of the device management ECU 3c and the automatic driving service of the ADAS-ECU 3d, L-IP Add04, L-IP Add05 and L-IP Add06 are allocated respectively as the local IP addresses to be used for the communication of the respective services. The local IP addresses are configured including an intrinsic code indicating a belonging network like 179.29.11.0/24 for example, according to a prior art.

The communication controller 2 communicates with a vehicle support server 6a, a navigation support server 6b, an AV service server 6c and an information provision server 6d present outside the vehicle 1 via an external communication network 5. The external communication network 5 is, for example, a communication network configuring the Internet, and can be connected by cellular communication. The vehicle support server 6a supports an automatic driving operation in the vehicle 1 by providing a detailed map of a road structure and a building structure or the like and images from an infrastructure facility such as a street camera. The navigation support server 6b supports a route guiding operation in the vehicle 1 by providing latest road map information, traffic jam information, road construction information and road surface information or the like. The vehicle support server 6a, the navigation support server 6b, the AV service server 6c and the information provision server 6d are configures with server computers.

The AV service server 6c provides music, video images and/or information relating to entertainments. The information provision server 6d provides various kinds of information including news and/or area information of events or the like. Here, the vehicle support server 6a, the navigation support server 6b, the AV service server 6c and the information provision server 6d correspond to a plurality of external devices present outside the mobile object in the present disclosure. Hereinafter, the vehicle support server 6a, the navigation support server 6b, the AV service server 6c and the information provision server 6d are collectively referred to as external devices 6.

The communication controller 2 controls the communication between the plurality of electronic devices 3 present inside the vehicle 1 and the plurality of external devices 6 present outside the vehicle 1. Specifically, the communication controller 2 includes a processor 7, a memory 8, a vehicle interior NW communication device (vehicle interior network communication device) 9 (transceiver and receiver) and a wireless communication device 10 (transceiver and receiver).

The memory 8 is configured by a volatile and/or non-volatile semiconductor memory. In the memory 8, a connection table 14 and a control program 15 to be executed by the processor 7 are stored. The vehicle interior NW communication device 9 is a transmitter-receiver which configures the vehicle interior communication networks 4 and performs wired communication and/or wireless communication of communicating with the electronic devices 3.

The wireless communication device 10 is a wireless transmitter-receiver for communicating with the external devices 6 via the external communication network 5. A plurality of intrinsic access point names (APN, Access Point Name), APN1, APN2, APN3 and APN4 are allocated to the wireless communication device 10. A power source of the wireless communication device 10 is turned on upon power activation of the vehicle 1 to transmit each of APN1, APN2, APN3 and APN4 which are the plurality of allocated access point names to a corresponding communication carrier (telecommunications carrier). Thus, an intrinsic global IP address is allocated to each access point name from each communication carrier and returned to the wireless communication device 10. Thus, the wireless communication device 10 communicates with the external devices 6 via the external communication network 5 by using the global IP address different for each access point name.

The wireless communication device 10 has an IP address translation processing function of NAPT (Network Address Port Translation) or the like. To the wireless communication device 10, communication data transmitted from the electronic devices 3 is inputted corresponding to the access point name which is one of APN1, APN2, APN3 and APN4, via a route control unit 12 of the communication controller 2 to be described later. The wireless communication device 10 executes IP address translation processing for the inputted communication data and translates the local IP address included in the communication data to an intrinsic address including the global IP address allocated to the corresponding access point name.

The processor 7 is, for example, a CPU (Central Processing Unit) included in a computer. The processor 7 may include a ROM (Read Only Memory) in which a program is written and a RAM (Random Access Memory) for temporarily storing data or the like. Then, the processor 7 includes a reception unit 11, the route control unit 12 and a state acquisition unit 13, as functional elements or functional units.

The functional elements provided in the processor 7 are achieved by, for example, executing the control program 15 by the computer which includes the processor 7. The control program 15 can be stored in an arbitrary computer-readable storage medium. Note that, instead, all or some of the functional elements provided in the processor 7 may be configured by hardware including at least one electronic circuit respectively.

The reception unit 11 receives the communication data accompanying execution of the services provided by the respective electronic devices 3. The communication data includes the transmission source local IP address indicating the transmission source. Here, the transmission source is the service of the electronic device 3 which has transmitted the communication data, and the transmission source local IP address is the local IP address allocated to the service. For example, the transmission source of the communication data of the communication performed by the AV service of the ICB 3*a* is the AV service, and the transmission source local IP address is L-IP Add01 which is the local IP address allocated to the AV service.

The route control unit 12 inputs the communication data received by the reception unit 11 to the wireless communication device 10 corresponding to the access point name which is one of APN1, APN2, APN3 and APN4 based on the transmission source local IP address included in the communication data. In particular, in the present embodiment, the route control unit 12 makes each address group including one or more transmission source local IP addresses correspond to one access point name, and inputs the received communication data to the wireless communication device 10. Here, the plurality of transmission source local IP addresses which are made to correspond to one access point name may be the transmission source local IP addresses of the services for which the belonging (that is, connected) vehicle interior communication networks 4 are mutually different.

Thus, in the communication controller 2, since the communication data from the plurality of services having mutually different transmission source local IP addresses can be inputted to the wireless communication device 10 and transmitted corresponding to one access point name, the number of APNs to be required for the number of services performed by the electronic devices 3 loaded on the vehicle can be reduced and the number of line contracts can be reduced.

Specifically, in the memory 8 of the communication controller 2, the connection table 14 including connection information indicating a correspondence relation between each address group and the access point name is stored. The route control unit 12 inputs the received communication data to the wireless communication device 10 corresponding to the access point name which is made to correspond to the transmission source local IP address included in the communication data, based on the connection information.

FIG. 2 is a diagram illustrating an example of the connection table 14 stored in the memory 8. In the illustrated connection table 14, a column on a leftmost side is referred to as a first column and the columns are referred to as a second column and a third column or the like in order toward a right direction in the figure. In addition, a row right below a top header row is referred to as a first row and the rows are referred to as a second row and a third row or the like in order toward a lower direction in the figure.

The first column of the connection table 14 illustrated in FIG. 2 indicates names of the services performed by the electronic devices 3, and the second column indicates the local IP addresses allocated to the respective services. The third column, fifth column and seventh column of the connection table 14 indicate the access point names to be made to correspond to the individual local IP addresses in each of Japan, United States of America and Europe, respectively. That is, by the connection table 14, a plurality of pieces of the connection information for each country or region are stored in the memory 8. Specifically, first connection information which is the connection information in Japan is indicated by the second column and the third column, second connection information which is the connection information in United States of America is indicated by the second column and the fifth column, and third connection information which is the connection information in Europe is indicated by the second column and the seventh column.

The individual connection information makes each address group including one or more transmission source local IP addresses correspond to one access point name. For example, in the first connection information, the address group including L-IP Add05, L-IP Add06 and L-IP Add03 which are three local IP addresses is made to correspond to APN1 which is one access point name. In addition, the address group including L-IP Add01 and L-IP Add04 which are two local IP addresses is made to correspond to APN2 which is one access point name, and the address group configured by L-IP Add02 which is one local IP address is made to correspond to APN3 which is one access point name.

The route control unit 12 specifies the country or the region where the vehicle 1 is currently present based on position information obtained from an in-vehicle GPS (not illustrated) normally provided in the vehicle, for example, and specifies the connection information corresponding to the specified country or region from the connection table 14 in FIG. 2. Then, using the specified connection information, the route control unit 12 inputs the communication data received by the reception unit 11 to the wireless communication device 10 corresponding to the access point name which is made to correspond to the transmission source local IP address included in the communication data.

Further, in the present embodiment, the plurality of access point names include an access point name for performing user charged communication which is communication generating a charge to a user of the vehicle 1, and an access point name for performing user free-of-charge communication which is communication not generating a charge to the user. For example, the fourth column of the connection table 14 illustrated in FIG. 2 indicates that the access point name APN1 is used for the user free-of-charge communication not generating a charge to the user, in Japan. In addition, the fourth column indicates that the access point names APN2 and APN3 are used for the user charged communication generating a charge to the user.

A communication charge which may be generated in the user free-of-charge communication can be calculated from a communication amount of the communication using the APN1 and paid to a provider providing the communication using the external communication network 5 by a vendor of the vehicle 1. Further, a communication amount and a service utilization charge generated in the user charged communication can be billed to the user from the provider via the vendor based on the communication amount of the communication using each of APN2 and APN3, for example. Information of the communication amount of the communication using the individual access point name can be collected by the vendor using an information collecting server (not illustrated) owned by the vendor connected to the external communication network, for example, according to the prior art.

In the present embodiment, as illustrated in the connection table in FIG. 2, the plurality of pieces of the connection information for each country or region include at least one local IP address which is made to correspond to the access point name for performing the user charged communication generating the charge to the user of the vehicle 1.

With reference to FIG. 1, the state acquisition unit 13 of the communication controller 2 acquires communication state information about whether or not the communication between the electronic device 3 and the external device 6 is being normally performed, and transmits the acquired communication state information to the electronic device 3. The acquired communication state information includes the information about whether or not each of the communication between the electronic device 3 and the route control unit 12, the communication between the route control unit 12 and the wireless communication device 10 for each access point name and the communication between the wireless communication device 10 and the external device 6 is normal.

Thus, for example, when a transmission request of the communication data is transmitted from a service function (the AV service or the like) of the electronic device 3 to the communication controller 2, by the state acquisition unit 13 acquiring the communication state information and returning the communication state information to the electronic device 3, service-oriented communication according to a SOME/IP (Scalable service-Oriented MiddlewarE over IP) protocol can be realized.

Next, a procedure of an operation in the communication controller 2 will be explained. FIG. 3 is a flowchart illustrating a procedure of communication control between the electronic device 3 and the external device 6 in the communication controller 2. The processing illustrated in FIG. 3 is repeatedly executed.

When the processing is started, first, the reception unit 11 determines whether or not the communication data is received from a service of any electronic device 3 (S100). Then, when no communication data is received (S100, NO), the reception unit 11 returns to step S100 to repeat the processing and stands by for reception of the communication data.

On the other hand, when the reception unit 11 receives the communication data (S100, YES), the route control unit 12 extracts the transmission source local IP address included in the received communication data. The route control unit 12 refers to the connection information at a current position of the vehicle 1, which is indicated by the connection table 14 stored in the memory 8, and specifies the access point name which is made to correspond to the extracted local IP address (S102).

Then, the route control unit 12 inputs the received communication data to the wireless communication device 10 corresponding to the specified access point name (S104). Subsequently, the wireless communication device 10 transmits the inputted communication data to the external device 6 using the global IP address allocated to the corresponding access point name (S106), and the processing is ended.

Note that the present invention is not limited to the configuration of the embodiment described above, and can be implemented in various modes without deviating from the gist.

For example, while all the access point names of APN1, APN2, APN3 and APN4 allocated to the wireless communication device 10 are used in any country or region, the access point name not to be used according to the country or the region may be allocated to the wireless communication device 10.

In addition, while the communication controller 2 controls the communication for the services in the other electronic devices 3 separate from the communication controller 2 in the embodiment described above, the communication controller 2 may perform selection control of the access point name to be used for the communication including the communication for the service performed by the communication controller 2 itself.

Further, while the numbers of the services that utilize the first vehicle interior communication network 4*a*, the second vehicle interior communication network 4*b* and the third vehicle interior communication network 4*c* are 4, 1 and 1 in the embodiment described above, the numbers may be arbitrary numbers.

The embodiment described above supports the following configurations.

(Configuration 1) A communication controller which controls communication between a plurality of electronic devices present inside a mobile object and a plurality of external devices present outside the mobile object and is provided in the mobile object, the communication controller including: a wireless communication device configured to communicate with one or more external devices via an external communication network present outside the mobile object; a reception unit configured to receive communication data including a transmission source local IP address indicating the transmission source from the electronic device; and a route control unit configured to input the received communication data to the wireless communication device based on the transmission source local IP address, wherein a plurality of access point names are allocated to the wireless communication device, and the route control unit makes each address group including one or more transmission source local IP addresses correspond to one of the access point names and inputs the communication data to the wireless communication device.

According to the communication controller of configuration 1, since the communication data from a plurality of services including mutually different transmission source local IP addresses can be inputted to the wireless communication device corresponding to one access point name and transmitted, the number of APNs to be required for the number of the services performed by the electronic devices loaded on the vehicle can be reduced and the number of line contracts can be reduced.

(Configuration 2) The communication controller according to configuration 1, wherein the plurality of access point names include an access point name used for user charged communication which is communication generating a charge to a user of the mobile object, and an access point name used for user free-of-charge communication which is communication not generating a charge to the user.

According to the communication controller of configuration 2, since the different access point names are used separately for the service that charges the user and the service that does not charge the user, charging processing is facilitated.

(Configuration 3) The communication controller according to configuration 1 or 2, including a state acquisition unit configured to acquire communication state information about whether or not the communication between the electronic device and the external device is being normally performed and transmit the acquired communication state information to the electronic device.

According to the communication controller of configuration 3, for example, since the communication state information about whether or not the communication with the external device is normally performed can be transmitted to the electronic device which has requested transmission of the communication data, the service-oriented communication of SOME/IP or the like can be performed.

(Configuration 4) The communication controller according to configuration 3, wherein the communication state information includes information about whether or not each of the communication between the electronic device and the route control unit, the communication between the route control unit and the wireless communication device for each access point name and the communication between the wireless communication device and the external device is normal.

According to the communication controller of configuration 4, factors when a communication state is abnormal can be easily determined.

(Configuration 5) The communication controller according to any one of configurations 1-4, wherein connection information indicating a correspondence relation between each address group and the access point name is stored, and the route control unit inputs the communication data to the wireless communication device corresponding to the access point name which is made to correspond to the transmission source local IP address included in the communication data, based on the connection information.

According to the communication controller of configuration 5, just by changing the connection information, a lineup of the services aggregated to each access point name can be easily rearranged.

(Configuration 6) The communication controller according to configuration 5, wherein a plurality of pieces of the connection information for each country or region are stored, and the route control unit uses the connection information corresponding to the country or the region where the mobile object is present to input the communication data to the wireless communication device corresponding to the access point name which is made to correspond to the transmission source IP address included in the communication data.

According to the communication controller of configuration 6, just by changing the connection information, a lineup of the services aggregated to each access point name can be easily rearranged for each country or region.

(Configuration 7) The communication controller according to configuration 6, wherein the plurality of pieces of the connection information for each country or region include at least one transmission source local IP address which is made to correspond to the access point name used for the communication generating a charge to a user of the mobile object.

According to the communication controller of configuration 6, since the different access point names are used separately for the service that charges the user and the service that does not charge the user for each country or region, the charging processing for each country or region is facilitated.

(Configuration 8) A communication control method performed by a computer of a communication controller which controls communication between a plurality of electronic devices present inside a mobile object and a plurality of external devices present outside the mobile object and is provided in the mobile object, the communication control method comprising: a step of receiving communication data including a transmission source local IP address indicating the transmission source from the electronic device; and a step of inputting the received communication data to the wireless communication device based on the transmission source local IP address, wherein a plurality of access point names are allocated to the wireless communication device, and each address group including one or more transmission source local IP addresses is made to correspond to one of the access point names and the communication data is inputted to the wireless communication device, in the step of inputting.

According to the communication control method of configuration 8, since the communication data from a plurality of services including mutually different transmission source local IP addresses can be inputted to the wireless communication device corresponding to one access point name and transmitted, the number of APNs to be required for the number of the services performed by the electronic devices loaded on the vehicle can be reduced and the number of line contracts can be reduced.

1 . . . vehicle, 2 . . . communication controller, 3 . . . electronic device, 3a . . . ICB, 3b . . . vehicle interior wireless router, 3c . . . device management ECU, 3d . . . ADAS-ECU, 4 . . . vehicle interior communication network, 4a . . . first vehicle interior communication network, 4b . . . second vehicle interior communication network, 4c . . . third vehicle interior communication network, 5 . . . external communication network, 6 . . . external device, 6a . . . vehicle support server, 6b . . . navigation support server, 6c . . . AV service server, 6d . . . information provision server, 7 . . . processor, 8 . . . memory, 9 . . . vehicle interior NW communication device, 10 . . . wireless communication device, 11 . . . reception unit, 12 . . . route control unit, 13 . . . state acquisition unit, 14 . . . connection table, 15 . . . control program.

What is claimed is:

1. A communication controller which controls communication between a plurality of electronic devices present inside a mobile object and a plurality of external devices present outside the mobile object and is provided in the mobile object, the communication controller comprising: a processor, a memory, and a wireless communication device which is a wireless transmitter and a wireless receiver, and which is configured to communicate with one or more external devices via an external communication network present outside the mobile object, wherein the processor:

receives communication data including a transmission source local IP (Internet Protocol) address indicating a transmission source from the plurality of electronic devices; and inputs the received communication data to the wireless communication device based on the transmission source local IP address, wherein a plurality of access point names, each of which is transmitted to a corresponding communication carrier, are allocated to the wireless communication device, wherein a connection table is stored in the memory, the connection table includes connection information indicating a correspondence relation between each address group including one or more transmission source local IP addresses and the access point name made to correspond to the transmission source local IP addresses in each country or region, and wherein the processor specifies the country or the region where the mobile object is currently present based on position information obtained from an in-vehicle GPS (Global Positioning System) provided in the mobile object, reads the connection table from memory, makes each address group correspond to one of the access point names according to the connection information included in the connection table corresponding to the country or the region, and inputs the communication data to the wireless communication device.

2. The communication controller according to claim 1, wherein the plurality of access point names include an access point name used for user charged communication which is communication generating a charge to a user of the mobile object, and an access point name used for user free-of-charge communication which is communication not generating a charge to the user.

3. The communication controller according to claim 1, wherein the processor acquires a communication state information indicating communication state between the plurality of electronic devices and the external device and transmits the acquired communication state information to the plurality of electronic devices.

4. The communication controller according to claim 3, wherein the communication state information includes information about communication between the plurality of electronic devices and processor, communication between the processor and the wireless communication device for each access point name and communication between the wireless communication device and the external device.

5. The communication controller according to claim 1, wherein the connection information for each country or region includes at least one transmission source local IP address which is made to correspond to the access point name used for the communication generating a charge to a user of the mobile object.

6. A communication control method performed by a computer of a communication controller which controls communication between a plurality of electronic devices present inside a mobile object and a plurality of external devices present outside the mobile object and is provided in the mobile object, the communication control method comprising:

a step of receiving communication data including a transmission source local IP (Internet Protocol) address indicating a transmission source from the plurality of electronic devices; and a step of inputting the received communication data to a wireless communication device based on the transmission source local IP address, wherein a plurality of access point names, each of which is transmitted to a corresponding communication carrier, are allocated to the wireless communication device, wherein a connection table is stored in a memory, the connection table includes connection information indicating a correspondence relation between each address group including one or more transmission source local IP addresses and the access point name made to correspond to the transmission source local IP addresses in each country or region, and wherein the country or the region where the mobile object is currently present is specified based on position information obtained from an in-vehicle GPS (Global Positioning System) provided in the mobile object, each address group is made to correspond to one of the access point names according to the connection information corresponding to the country or the region specified based on the connection table, and the communication data is inputted to the wireless communication device, in the step of inputting.

* * * * *